(12) United States Patent
Futscher et al.

(10) Patent No.: US 8,865,817 B2
(45) Date of Patent: Oct. 21, 2014

(54) RAPIDLY CURING COMPOUND HAVING GOOD ADHESIVE PROPERTIES

(75) Inventors: Michael Futscher, Nussdorf (DE);
Werner Luft, Reitmehring (DE)

(73) Assignee: Tremco Illbruck Produktion GmbH, Bodenwöhr (DE)

( * ) Notice: Subject to any disclaimer, the term of this patent is extended or adjusted under 35 U.S.C. 154(b) by 0 days.

(21) Appl. No.: 13/988,156

(22) PCT Filed: Nov. 15, 2011

(86) PCT No.: PCT/EP2011/005744
§ 371 (c)(1),
(2), (4) Date: Aug. 6, 2013

(87) PCT Pub. No.: WO2012/065716
PCT Pub. Date: May 24, 2012

(65) Prior Publication Data
US 2013/0317169 A1    Nov. 28, 2013

(30) Foreign Application Priority Data

Nov. 19, 2010  (DE) .......................... 10 2010 052 016

(51) Int. Cl.
| | |
|---|---|
| C08K 3/32 | (2006.01) |
| C08K 3/20 | (2006.01) |
| C08L 83/16 | (2006.01) |
| C09J 11/06 | (2006.01) |
| C08G 18/28 | (2006.01) |
| C08G 65/336 | (2006.01) |
| C08L 71/02 | (2006.01) |

(52) U.S. Cl.
CPC ............... C09J 11/06 (2013.01); C08G 18/289 (2013.01); C08G 65/336 (2013.01); C08L 71/02 (2013.01)
USPC ........... 524/414; 524/413; 524/416; 524/417; 524/435; 524/437; 524/588; 524/589; 528/34

(58) Field of Classification Search
None
See application file for complete search history.

(56) References Cited

U.S. PATENT DOCUMENTS

| | | | |
|---|---|---|---|
| 6,124,235 A | 9/2000 | Letoffe et al. | |
| 6,395,855 B1 | 5/2002 | Luft et al. | |
| 6,506,279 B1 | 1/2003 | Luft et al. | |
| 7,902,269 B2 * | 3/2011 | Bublewitz et al. | 523/109 |
| 2003/0149152 A1 * | 8/2003 | Hao | 524/435 |
| 2012/0055105 A1 * | 3/2012 | Kohl et al. | 52/173.3 |

FOREIGN PATENT DOCUMENTS

| | | |
|---|---|---|
| DE | 69429565 T2 | 8/2002 |
| EP | 1097183 B1 | 4/2002 |
| EP | 1102815 B1 | 11/2002 |
| EP | 1298169 A1 | 4/2003 |
| JP | 2-185565 * | 7/1990 |
| WO | 0005308 A1 | 2/2000 |
| WO | 2009060199 A2 | 5/2009 |
| WO | 2010131037 A1 | 11/2010 |

OTHER PUBLICATIONS

Written Opinion issued Dec. 12, 2012 in Int'l Application No. PCT/EP2011/005744.
Int'l Search Report issued Apr. 23, 2012 in Int'l Application No. PCT/EP2011/005744.
English translation of the Int'l Preliminary Report on Patentability issued May 23, 2013 in Int'l Application No. PCT/EP2011/005744.

* cited by examiner

Primary Examiner — Marc Zimmer
(74) Attorney, Agent, or Firm — Panitch Schwarze Belisario & Nadel LLP

(57) ABSTRACT

A curable compound is provided, which can be obtained as a mixture of at least two components to be stored separately, of which one component includes a silane-modified polymer and the component of a second component includes an acid or basic salt containing water of crystallization. An aminic adhesion promoter is contained in one or both components or a further component, with the stipulation that no component contains all three substances. Additionally, a method is provided for accelerating the curing of a silane-modified polymer, in which an acid or basic salt containing water of crystallization is added to the silane-modified polymer.

16 Claims, No Drawings

US 8,865,817 B2

RAPIDLY CURING COMPOUND HAVING GOOD ADHESIVE PROPERTIES

CROSS-REFERENCE TO RELATED APPLICATIONS

This application is a Section 371 of International Application No. PCT/EP2011/005744, filed Nov. 15, 2011, which was published in the German language on May 24, 2012, under International Publication No. WO 2012/065716 A1 and the disclosure of which is incorporated herein by reference.

BACKGROUND OF THE INVENTION

The present invention relates to rapidly curing compounds based on silane-modified polymers.

Silane-modified polymers represent a more recent development in the field of sealants. They extend the range of these materials, which include chemically reactive compounds such as silicones, polyurethanes and polysulfides as well as chemically non-reactive compounds such as butyl sealing materials, solvent-containing sealing materials and dispersion sealing materials. For sealing a joint or an aperture, sealing materials must meet a plurality of requirements and particularly they must have good adhesive properties with respect to the flanks of the joint or to the substrates. For this purpose, they should normally be elastic in order to compensate spatial changes of the joint occurring as a result of temperature changes. Also compatibility with the substrates must be guaranteed.

Silane-modified polymers are cold vulcanized one- or two-component compounds. These are polymers such as polyether or polyurethanes containing silane end groups that cross-link into rubber-like elastic or plasto-elastic materials under absorption of water at room temperature. In one-component systems, the water usually comes from the atmosphere. During the chain elongation or cross-linking reaction, alcohol is separated from the silane end groups, namely methanol or ethanol in the most widely spread methoxy or ethoxy end groups. After curing, the products are characterized by good self-adhesion to the most different material surfaces and by a generally good resistance to the influences of temperature, light, atmosphere, moisture and chemicals.

The curing of one-component compounds that will cross-link under the absorption of moisture at room temperature runs comparatively slowly because the water necessary for the reaction is required to diffuse from the surrounding atmosphere into the interior of the compound. The curing speed therefore decreases with a proceeding reaction in the interior of the compound. At a low air moisture or at an unfavorable surface-to-volume of compound ratio, the reaction can become very slow or can even completely come to a standstill in steam-tight closed rooms.

Although such atmospheric moisture-hardening silane-modified polymer compounds can be normally used in a wide range, use thereof as adhesive or sealing materials is limited, particularly in the industrial production, due to their slow curing. If only slowly hardening compounds are used in industrial productions, short station times that are desired for economic reasons account for huge intermediate storage facilities required for reliably curing sealed or glued components. Where necessary, these intermediate storage facilities must be additionally air-conditioned, humidified or ventilated. Thus high quantities are possibly produced already before a first-time examination of finished parts for freedom from defects and operational reliability is carried out. Large-area adhesive connections between diffusion-tight surfaces using atmospheric moisture-hardening compounds are feasible as little as the production of molded bodies in closed molds.

Also known are two-component compounds based on silane-modified polymers. One example is International patent application publication No. WO 2009/060199, which proposes such compounds as a sealing compound for insulating glass panes. Curing shall be achieved by the addition of a moist filling material, which is calcium carbonate in the examples. Even this system is not optimal in every respect.

From German Patent DE 69429565 it is known that hardening of α,ω-di(hydroxy)diorganopolysiloxane polymers in mixtures with different cross-linking agents, filling materials, plasticizers etc. can be accelerated if mixed with an aqueous second component. As a substrate for water also $Na_2B_4O_7 \cdot 10H_2O$, $Na_2HPO_4 \cdot 12H_2O$ and $Na_2CO_3 \cdot 10H_2O$ are mentioned in addition to zeolites and silica gel. Scarcely any example achieved curing in less than 24 hours.

International patent application publication No. WO 2010/131037 describes intumescent compositions that are applied as a coating to steel constructions for fire protection. The intumescent compositions consist of a first component from alkoxysilane-terminated polyethers or polyurethanes, and a second component from plasticizers and intumescent additions/raw materials, an acid source, a carbon source and a gas source. The composition can be formulated both as a one-component and a two-component composition. Application thereof shall take place by spraying so that the composition is not suitable as a sealing or adhesive material from the aspect of viscosity.

It would be expedient to have a system in which the mixing ratio between the components can be varied in vast ranges in order to obtain even better mechanical properties and adhesive properties. Further, it would be desirable to be able to observe the effectiveness of the mixing of the components through different colors of both components. Moreover, the components should be formulated in such a manner that the viscosities are similar or matched in order to facilitate good intermixture of both components. Also the adjustment of the residual moisture of the raw materials, particularly of the filling materials, is complicated and it would be desirable to have a system in which curing is independent of the residual moisture. It would also be expedient to have a system which can be formulated solvent-free (environmental safety, operational safety) and/or silicone-free (compatibility with substrates).

BRIEF SUMMARY OF THE INVENTION

Accordingly, the object of the invention was to provide a compound for the production of sealing and/or adhesive materials which can cure independently of the surrounding air moisture. The curing process of the compound shall also take place independently of the residual moisture of filling materials and other raw materials and without the addition of liquid water. Self-adhesion to various materials, mechanical properties, temperature resistance, and resistance to chemical substances shall be maintained in addition to the typical characteristics of the previously known vulcanizates, and cuttability in connection with surface dryness to the touch shall be achieved within a short time, i.e. preferably within a few minutes up to a few hours time, meaning that the compound shall be rapidly curing.

Now it has been found that mixtures of silane-modified polymers with crystallization water-containing acid or basic salts and aminic adhesion promoters, wherein the compounds may contain plasticizers, fillers, catalysts, pigments, other adhesion promoters, colorants, usual additives as well as solvents, can achieve the stated objects.

Accordingly, the invention relates to a curable compound, which can be obtained as a mixture of at least two components to be stored separately, of which one component comprises a silane-modified polymer and the component or a second component comprises an acid or basic salt containing water of crystallization, and wherein an aminic adhesion promoter is contained in at least one of the two components, with the stipulation that no component contains all three substances. The invention also relates to a method for accelerating the curing of compounds based on silane-modified polymers, wherein a silane-modified polymer cross-linkable with water, a crystallization water-containing acid or basic salt, and an aminic adhesion promoter are distributed to at least two components in such a manner that no component contains all three substances, and wherein the components are mixed for curing.

The compounds of the invention are provided in the form of at least two-component mixtures. Corresponding to the intended use, the compounds are paste-like or liquid as known per se, preferably paste-like. The use of crystallization water-containing acid or basic salts as an accelerator component leads to that after the mixing of the components curing is accelerated and achieved more rapidly compared to 1K systems (1K=one component), i.e. cuttability and surface dryness to the touch of the compounds are achieved more rapidly.

Rapidly curing means that curing to the degree of cuttability of the compound takes place within minutes, e.g. 5, 15, 30 or 60 minutes, up to a few hours, e.g. 1, 2, 3 or 4 hours. Mixtures of the invention can also be formulated so that cuttability is only obtained after more than 10, 20 or 30 hours. Such compounds are less preferred. While curing thereof is accelerated compared to 1K systems, these compounds are not rapidly curing.

For testing the curing of the compounds, cuttability is determined as follows. After mixing the mutually reacting components, the compound is applied to a dry, level surface in the form of a bead of at least 8 mm height and 8 mm width. Every 5 to 10 minutes the bead is transversely cut using a knife. Cuttability is defined by the time after mixing at which no paste-like residues remain on the knife when the bead is cut. As soon as cuttability of the compound is reached, curing is given to such an extent that the bead is cross-linked both on the outer surface and in the interior. The point of cuttability is a parameter that cannot be equated with the final strength. The final strength is reached only later.

As a measure for the final strength, hardness Shore A according to DIN 53505 is determined after 7 days from the preparation of the mixture of the components or after the initial contact of a compound with air. Additional important properties are the tensile strength and the strain to rupture, which are determined according to DIN EN 28339.

The compounds of the invention do not have intumescent properties, i.e. they do not contain components which cause a substantial increase in volume under the influence of heat in the case of fire.

DETAILED DESCRIPTION OF THE INVENTION

Silane-modified polymers are known per se. These are structures in which a polymer chain, e.g. a polyether or polyurethane, comprises silane end groups. Particularly suitable are structures like:

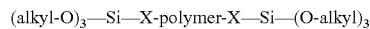
(alkyl-O)$_3$—Si—X-polymer-X—Si—(O-alkyl)$_3$ and

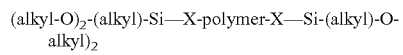
(alkyl-O)$_2$-(alkyl)-Si—X-polymer-X—Si-(alkyl)-O-alkyl)$_2$

Alkyl typically represents $CH_3$ or $C_2H_5$. There can be present different alkyl radicals, e.g. one or two methoxy and two or one ethoxy group or one methyl and two ethoxy groups on one Si. Silane-modified polymers in which the alkyl groups are similar are most widely spread. X represents a compound group, which links/connects the polymer to the silane, e.g. an alkyl group, wherein the compound groups can be similar or different. Polymer represents a polymer chain such as preferably a polyether or polyurethane. It will be understood that not all the polymer chains are equally long, as usual. Branched polymer chains may be used as well. According to the invention, the polymers are at least bi-functional silane-modified polymers. Silicones like e.g. polydimethylsiloxane or alkoxy-terminated silicones are no silane-modified polymers in terms of the invention.

Silane-modified polymers are commercially available under various names like MS-polymer, hybrid polymer, PUSI, SPUR. The curing reaction proceeds with the access of water by elimination of alcohol from a first silane-modified polymer and then cross-linking with other silane-modified polymers and further elimination of alcohol.

Suitable silane-modified polymers are for instance the hybrid polymers STP-E10, STP-E15, STP-E30, STP-E35 from Wacker Chemie GmbH, the hybrid polymers ST 61, ST 75, ST 77, ST XP AG 48 from Hanse Chemie, the MS-polymers SAT 010, SAX 350, S203H, S303H, SAX 400, S227 from Kaneka Corporation or the SPUR prepolymers Desmoseal S XP 2662, XP 2458, XP 2636, XP 2749 from Bayer Material Science AG, and SPUR 1050MM, SPUR 1015LM, SPUR 3100HM, SPUR 3200MM from Momentive Performance Materials Inc., or mixtures of two or more thereof.

The percentage of the silane-modified polymers in a component, for example the first component, can amount to 100% by weight, and preferably it is in the range from 3 to 50% by weight. The percentage also depends on the mixing ratio of the components and whether other components also contain silane-modified polymer. All in all, the compound mixed from all components should contain 5 to 50% by weight, preferably 10 to 40% by weight, of silane-modified polymer. As further constituents of the component, e.g. the first component, plasticizers, fillers, stabilizers, drying agents, catalysts, adhesion promoters and other suitable additives for sealing materials based on silane-modified polymers may be considered.

The compound of the invention contains in one component, preferably in a second component, crystallization water-containing salts, which perform an acid or basic reaction in an aqueous solution. According to the invention, it is important that the salts contain crystallization water. The use of salt having residual moisture, i.e. having additional free water not bound as water of crystallization, is possible, but is not required and is not preferred within the scope of the invention. The crystallization water-containing salts yielding acid or basic solutions, in the following briefly referred to as "acid or basic salts" or "salts", act as accelerators for the curing of the silane-modified polymers. Acid or basic salts are understood to be compounds in which the cation is based on a weak base and/or the anion is based on a weak acid. Through the different degrees of dissociation of the underlying acids and bases, the solutions of the salts perform an acid or basic reaction.

Particularly useful are salts in which the anion is selected from phosphate, sulfate, meta-silicate, hydroxide sulfate and hydroxide phosphate or salts containing a cation acting acidic or basic and selected from metals of the main group III and the subgroup II, and ammonium. According to the invention, it is essential that the aqueous solution of the salt has a pH value above or below 7. This is achieved in that the salt contains at least one ion which corresponds to a weak acid or weak base and accordingly reacts acidic or basic in an aqueous solution.

From an economic point of view, inexpensive commercially available salts are preferred. It is also convenient if the salts as such are as little toxic as possible and easy to handle.

Particularly preferred are the acid salts of the aluminum, in particular the sulfate, the chloride and the nitrate, the aluminum alums of the ammonium ion and of the alkali metals, especially of the sodium and of the potassium. Moreover, as advantageous representatives of acid salts the salts of iron are to be mentioned, in particular the iron-II-sulfate, the iron-III-phosphate, the iron alum of the ammonium ion as well as the iron-II-sulfate ("Mohr's salt"). Basic salts having an accelerating effect are for example trisodium phosphate, ammonium aluminum alum, trimagnesium phosphate and potassium meta-silicate. The acid and basic salts can also be used in combination.

Another essential component of the compounds of the invention are aminic adhesion promoters. The adhesion promoter can either be combined together with the salt and/or preferably together with the silane-modified polymer in one component, and it can be even provided as a third component, but this is less preferred. Important is that no component contains the silane-modified polymer, together with the salt and the adhesion promoter.

The adhesion promoter is an aminic silane or siloxane compound. Preferred silane compounds are for example aminic alkoxy silanes like aminopropyltrimethoxysilane, aminopropyltriethoxysilane, N-(n-butyl)-3-aminopropyltrimethoxysilane, N-(beta-aminoethyl)-gamma-aminopropyltrimethoxy-silane, with the structural element

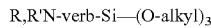

R,R'N-verb-Si—(O-alkyl)$_3$ or

R,R'N-verb-Si(R")—(O-alkyl)$_2$ wherein alkyl preferably is $CH_3$ or $C_2H_5$, verb represents an alkyl chain, preferably n-$C_3H_6$, and R and R' are organic radicals or hydrogen, and R" is an organic radical. Also compositions of two or more of these compounds are suitable. The aminic adhesion promoters are commercially available, e.g. aminic siloxane compounds under the name Haftmittel AMS 50, Haftmittel AMS 60, Haftmittel AMS 70 from Wacker Chemie GmbH, or under the name Y-15744 from Momentive Performance Materials Inc., and the preferred aminic silane compounds for example under the name Haftmittel AMS 24, Geniosil GF93 from Wacker Chemie GmbH, Dynasylan DAMO-T from Evonik Degussa GmbH or under the name Silquest A 1110 from Momentive Performance Materials Inc. Advantageously, 0.05% to 10% by weight, preferably 0.1 to 5% by weight and particularly 0.5 to 2% by weight of aminic adhesion promoters are used based on the weight of the component. Also the percentage of aminic adhesion promoters depends on the mixing ratio of the components. Overall, the compound of the invention should contain 0.1 to 5% by weight, preferably 0.5 to 2% by weight of aminic adhesion promoters.

According to the invention, also non-aminic adhesion promoters can be used in addition, in order to improve the adhesion to substrates, e.g. 3-glycidoxypropyl trimethoxy silane, 3-methylacrylic acid ester propyltrimethoxy silane, propane-3-thioltrimethoxy silane, propane-3-thioltriethoxy silane, propane-3-thiolmethyldimethoxy silane and others.

A preferred further constituent of the components are plasticizers. As plasticizers there are to mentioned: phthalates, (e.g. dibutyl-, dioctyl-, dicyclohexyl-, diisooctyl-, diisododecyl-, dibenzyl-, diisononyl- and butylbenzyl-phthalate), cyclohexane di-carbonic acid ester (e.g. 1,2-diisononyl cyclohexane dicarboxylic acid ester, briefly DINCH), esters of organic acids such as trimellitic acid, pyromellitic acid, adipine acid, sebacine acid, fumaric acid, maleine acid, itaconic acid and citric acid, derivates of polyesters, polyethers, epoxides and the like, polybutene, ricinus oil (castor oil), natural oils. The percentages are preferably in a range of 0 to 40% by weight, typically 10 to 20% by weight. Several plasticizers can be used.

It is advantageous if the components contain fillers. One preferred filler is silica, e.g. pyrogenic silica, in particular hydrophobized types. The percentage of silica (preferably is 0 to 30% by weight. Other suitable fillers are precipitated chalk, treated and untreated, natural chalk, treated and untreated, bentonite, barium sulfate, clay, aluminum oxides and hydroxides, chromium oxides, titanium oxides, graphite, carbon black (e.g. Printex L), preferably chalk, in proportions of 0 to 55% by weight. Using several fillers is usual and also possible according to the invention. The use of fillers having a high residual moisture, e.g. chalk, is possible, but not necessary in context with the invention. But drying can also be dispensed with; characteristic residual moistures of chalk in the range of 0.2 to 0.4% or of silica in the rage of <1% are not disturbing. These low residual moistures do not have any noticeable influence on curing.

Further, stabilizers like UV absorbers, light stabilizers, antioxidants etc. can be contained at an overall percentage of 0 to 2% by weight, preferably of 0.2 to 0.6% by weight. Using combinations such as one or more UV absorbers and antioxidants is possible and usual.

Typical additives also are desiccants: for example vinyltrimethoxy silane, methyltrimethoxy silane, vinyltriethoxy silane. Their percentages range from 0 to 5% by weight, preferably from 0.5% by weight to 3% by weight.

Preferably, the components of the compounds of the invention do not contain any substantial residual moisture. The residual moisture should be less than 1% by weight, preferably less than 0.5% by weight and particularly preferably less than 1% by weight.

Catalysts such as tin compounds, e.g. dibutyltin laurate, dioctyltin laurate and other tinorganic compounds can be contained. Usual percentages range from 0 to 2% by weight, preferably from 0.1% by weight to 1% by weight. In silane-modified polymers based on the α-silane-technology, i.e. with an amino group—NH—in the α position to the silicon of the alkoxysilane end group as a component of the compound group X, the use of a tin(catalyst) can be set aside. In other silane-modified polymers a catalyst is preferably used in order to achieve fast drying. When a catalyst is used it proves as value if the compound of the invention contains totally 0.2 to 2% by weight, preferably 0.1 to 1% by weight of all components.

Other additives such as rheological additives, polyisobutylene like Hyvis 30, waxes, color pigments like carbon black, titanium dioxide, iron oxides, etc. may be contained. When they are added, the usual amounts are used.

In a preferred embodiment, the components of the compound of the invention are differently pigmented.

According to the invention, the addition of solvents is not necessary. For environmental reasons it is preferred if no solvents are contained. But a removal of solvents which are present in the substances which are used, e.g. from the production, is normally not required. If desired, aliphatic hydrocarbons, toluol, xylol and isopropanol can be used as solvents for example.

The crystallization water-containing acid or basic salts can be the only constituent of one component, e.g. of the second component. However, the salt is preferably mixed with a substrate or dispersed in a substrate in order that the components can be mixed in a paste-like or liquid form. Preferred substrates are plasticizers, as mentioned above, silane-modified polymers, as mentioned above and, less preferred, silicones like hydroxy- or alkyl-terminated polydialkyl siloxanes, e.g. methyl-terminated polydimethyl siloxanes. Also mixtures of plasticizers and silane-modified polymers, or less preferred, of plasticizers and silicones can be used as substrates.

In this embodiment, the component containing the crystallization water-containing acid or basic salt(s) preferably contains 10 to 95% by weight of the substrate and 5 to 90% by weight of the salt. The percentage of salt in the component depends on the weight ratio at which the components are mixed. For compounds consisting of a first component that contains the silane-modified polymer, and a second component that contains the salt, a high percentage of salt must be chosen for a mixing ratio of the component of e.g. 100:10, whereas at a mixing ratio of 100:100 or 100:400 the percentage of salt can be lower. The percentage of salt should be in a range of 1 to 15% by weight, preferably of 3 to 10% by weight, based on the total mixture of the curable compound.

In the component having the salt, plasticizers, fillers, usual additives, pigments, colorants as well as solvents as described above can be contained in addition to the substrate(s) and the salt(s). Preferably, the second component contains the salt(s) and one or more substrates as well as one or more fillers, in particular chalk and/or pyrogenic silica.

Particularly preferred are curable compounds having a first component that contains silane-modified polymer, aminic adhesion promoters and where necessary plasticizers, fillers, stabilizers, desiccants, other adhesion promoters, catalysts and other usual additives, and having a second component that contains crystallization water-containing acid or basic salt in silane-modified polymer and/or plasticizers as well as fillers, if necessary, usual additives, pigments and colorants. The first component preferably contains in particular silane-modified polymer, plasticizers, aminic adhesion promoter(s), where necessary catalysts and fillers. The second component preferably contains crystallization water-containing acid or basic salt in silane-modified polymer and/or plasticizers as well as fillers.

Further preferred compounds have a first component of modified polymer and, depending on the polymer, with our without catalyst, and if necessary plasticizers, fillers, stabilizers, desiccants, non-aminic adhesion promoters, catalysts and other usual additives, and a second component containing crystallization water-containing acid or basic salt in plasticizer, aminic adhesion promoter(s) as well as fillers, if necessary, usual additives, pigments and colorants. Here the first component particularly preferably contains silane-modified polymer, plasticizers, a catalyst, if necessary, and fillers. The second component here preferably contains crystallization water-containing acid or basic salt in plasticizer, aminic adhesion promoter(s) as well as fillers.

Still further preferred compounds have a first component of an aminic adhesion promoter and a second component containing crystallization water-containing acid or basic salt in silane-modified polymer. Even in this case, one or both components can contain plasticizers, fillers, stabilizers, desiccants, other adhesion promoters, catalysts and other usual additives. Preferably contained are at least plasticizers and fillers. Depending on the silane-modified polymer, a catalyst is contained in at least one component, if necessary.

Preferably, all components of the compound of the invention are solvent-free, silicone-free or solvent-free and silicone-free.

Preferred mixing ratios (weight) of the components are in a range of 100:3 to 100:1000, in particular in a range of 100:8 to 100:100, wherein the silane-modified polymer or the major part thereof is contained in the first component, whereas the salt is typically contained in the second component.

It is within the scope of the invention to mix a curable compound from more than two components, e.g. three, but this is not preferred.

Possible applications of the rapidly curing compound of the invention are the adhesive connection of construction components such as strips, facings etc., the adhesive connection of housing covers, the adhesive connection of components in system construction, the adhesive connection in conjunction with varnished surfaces (since silicone-free), in particular glass-metal, glass-coated metal, glass-plastic material, glass-glass, metal-metal, plastic material-plastic material. Further, the compounds can be used as an insulating glass sealing material, specifically for secondary sealing, and for sealing joints in the floor, wall and ceiling area indoors and outdoors.

The production and processing of the compounds of the invention per se corresponds to the technology which is known in context with silane-modified polymers and silicone compounds and will thus not be described in more detail. In practice, both components can be mixed from side-by-side coaxial cartridges, from tubular bags with the use of special guns, from barrels and hobbocks via static and dynamic mixing units. The mixing technique is adjusted to the curing speed and to the specific application.

The invention will now be described by way of the following examples, without however being limited to the specifically described embodiments. The stated percentages are based on the weight and in case of doubt on the total weight of the compound, unless otherwise stated or followed from the context.

The invention relates to all the combinations of preferred embodiments, as far as the same are not mutually exclusive. The terms "about" or "approximately" in combination with figures mean that values are included which are higher or lower by 10%, or higher or lower by 5%, and in any case higher or lower by 1%.

Example 1

A component A1 was prepared by mixing the raw materials shown in Table 1 produced in a planetary dissolver under vacuum conditions.

TABLE 1

| Component A1, base STP-E | |
|---|---|
| Silane-modified polymer Geniosil STP-E | 16% |
| Plasticizer diisononylphthalate (DINP) | 18% |
| Stabilizers | 0.5% |
| Precipitated coated $CaCO_3$ | 48% |
| Natural $CaCO_3$ | 12% |
| Vinyltrimethoxysilane | 1.5% |
| Adhesion promoter γ-aminopropyltrimethoxysilane | 1% |
| Catalyst dibutyltin dilaurate | 0.02% |
| Coloring paste | 2.98% |
| Total | 100% |

The mixing procedure yielded a homogenous compound, which slowly cured from the surface by the action of air moisture. After 24 hours at 23° C. and 50% relative air moisture, a skin with a layer thickness of 2.5 mm had formed. A bead of 8 mm height and 8 mm width of component A1 cured only slowly. Cuttability was achieved only after 4 days.

100 g of component A1 were thoroughly mixed in each case with 10 g of different basic and acid salts in a speed mixer for 30 seconds. Thereafter, cuttability of the mixture was determined, and after 7 days Shore hardness A according to DIN 53505 was measured. The salts that had been examined and the results are given in Table 2.

TABLE 2

| Salt | pH* | cuttable after | Shore hardness A |
|---|---|---|---|
| $Na_3PO_4 \times 12\ H_2O$ | 12 | 30 minutes | |
| $NH_4MgPO_4 \times 6\ H_2O$ | 8 | 20 minutes | |
| $Mg_3(PO_4) \times 8\ H_2O$ | 10 | 39 hours | |
| $Na_3PO_4 \times 6\ H_2O$ | 12 | 60 minutes | |
| $Al(OH)(PO_4) \times 12\ H_2O$ | 7.2 | 30 minutes | |
| $Na_3PO_4 \times 10 H_2O$ | 12 | 10 minutes | 43 |
| $Al_2(SO_4)_3 \times 16\ H_2O$ | 3-4 | 35 minutes | 40 |
| $NH_4Fe(SO_4)_2 \times 12\ H_2O$ | 1 | 10 minutes | 35 |
| $Fe(PO_4) \times 4\ H_2O$ | acidic | 5 minutes | 43 |
| $FeSO_4 \times 7\ H_2O$ | 3-4 | 35 minutes | 40 |
| $NH_4Al(SO_4)_2 \times 12\ H_2O$ | 3-4.5 | 2.5 hours | 50 |
| $KAl(SO_4)_2 \times 12\ H_2o$ | 3-3.5 | 2.5 hours | 40 |

*pH value according to the manufacturer's specification

The examples prove that mixtures with an addition of crystallization water-containing acid or basic salt achieve uniform curing, even in layers >8 mm. Compared thereto, non-accelerated formulations cure only slowly under the action of air moisture. This takes place from the surface. The material is still soft inside, and there remains a paste-like residue on the knife. With beads having a layer thickness of 8 mm, cuttability is given only after 4 days.

Example 2

In a further experiment, aluminum hydroxide phosphate×12H$_2$O was not directly mixed with component A1. Instead it was used mixed with a substrate to form a component B. For this purpose, 8% by weight of the aluminum hydroxide phosphate were mixed in each case with 92% by weight of different substrates to form a component B at room temperature under vacuum conditions using a laboratory dissolver. The mixing procedure in each case yielded a whitish suspension. The substrates that were used and the results of measuring cuttability of mixtures of 100 parts by weight of component A1 from example 1 with 100 parts per weight of these components B produced in the speed mixer, are shown in Table 3.

TABLE 3

| Substrate | Cuttability after |
|---|---|
| ST-61 | 3 hours |
| SPUR 1015 LM | 3 hours |
| Desmoseal S XP2636 | 2 hours |
| Genioseil STP-E10 | 30 minutes |
| Diisononylphthalate | 2 hours |

These examples show that the curing of the crystallization water-containing basic salt mixed with a substrate cures is considerably accelerated compared to the air moisture-hardening component A1. With a bead of 8 mm height and 8 mm width, cuttability is reached in a time between 30 minutes and 3 hours, depending on the substrate.

Example 3

The effect of storage of component B prepared from a substrate mixed with aluminum hydroxide phosphate× 12H$_2$O was examined. For this purpose, mixtures prepared from 8% aluminum hydroxide phosphate×12H$_2$O and 92% of silane-modified Polymer ST-61 or plasticizer diisononylphthalate had been stored for 6 months. In the mixture with diisononylphthalate, solid components settled out that were stirred up during mixing with component A1 from example 1. A mixture of 100 parts of component A1 and 25 parts of component B required 90 minutes to reach cuttability in the case of ST-61 and 100 minutes in the case of diisononylphthalate. Example 3 proves that the accelerating effect is maintained even over a storage time of 6 months. The B components are stable regarding storage, and the only thing required is to stir up the solid components that have settled out.

Example 4

The components B were thickened with pyrogenic silica in order to prevent the solid matter in the mixture from settling out during the storage time. The formulations were mixed from different substrates or substrate compounds, silane-modified polymer SPUR 1015 LM and the plasticizer diisononylphthalate (DINP) as well as crystallization water-containing basic aluminum hydroxide phosphate and different percentages of pyrogenic silica. The percentage of pyrogenic silica was chosen so as to yield a homogeneous, slightly steady paste. The components B thus prepared were mixed with component A1 from example 1 at different mixing ratios in the speed mixer, and cuttability was measured using a bead of 8 mm height and 8 mm width. The results are shown in Table 4.

TABLE 4

| Component B | Weight ratio A:B | Cuttability after |
|---|---|---|
| 20% SPUR 1015 LM, 60% DINP | 100:100 | 3 hours |
| 10% aluminum hydroxide phosphate × 12 H$_2$O | 100:50 | 75 minutes |
| 10% pyrogenic silica | 100:25 | 60 minutes |
| 79% SPUR 1015 LM | 100:100 | 3 hours |
| 15% aluminum hydroxide phosphate × 12 H$_2$O | 100:50 | 60 minutes |
| 6% pyrogenic silica | 100:25 | 60 minutes |
| 90 SPUR 1015 LM | 100:100 | 13 hours |
| 5% aluminum hydroxide phosphate × 12 H$_2$O | 100:50 | 10 hours |
| 5% pyrogenic silica | 100:25 | 36 hours |

The examples show that the mixing ratios of component A1:component B can be varied in a vast range of percentages (100:100 to 100:25) and that an accelerated curing is nevertheless obtained compared to the curing of component A1 merely by the action of air moisture. The times of cuttability greatly vary depending on the mixing ratio. It can also be seen that only a low percentage of basic neutral salt considerably extends the time until cuttability of the mixture. A minimum amount of acid or basic salt is required to achieve rapid curing.

Comparative Example 1

Various salts which either contain no crystallization water or whose aqueous solution reacts neutrally were examined for the purpose of comparison. To this end, two different components B, namely a first component B prepared from 78% diisononylphthalate, 14% hydrophobized pyrogenic silica and 8% salt, and a second component B prepared from 50% diisononylphthalate, 10% hydrophobized pyrogenic silica and 40% salt were prepared. As salt were used calcium carbonate-precipitated types with 0.2% by weight of residual moisture, calcium carbonate natural types with 0.4% by weight of residual moisture, sodium hydrogen carbonate, water-free calciumsulfate and $CaSO_4 \times 2H_2O$. Mixtures of 25 parts per weight each of these components B with 100 parts of component A1 as described in example 1, did not exhibit cuttability after 48 hours. Only the surface was cured. This shows that neither acid or basic salts without crystallization water nor crystallization water-containing neutrally reacting salts accelerate curing.

Comparative Example 2

10 parts by weight of powdery calcium hydroxide are mixed with 76 parts by weight of the plasticizer diisononylphthalate and 14 parts by weight of pyrogenic silica in the vacuum planetary dissolver. 100 parts of the mixture thus produced are mixed with 100, 25 and 10 parts by weight of component A1 from example 1 in the speed mixer. Acceleration is not achieved with any of the mixing ratios, i.e. all three mixtures react similarly slowly as component A1 alone. This shows that basic salts which do not contain crystallization water such as calcium hydroxide cannot accelerate curing of silane-modified polymer mixtures. This effect is only obtainable with the crystallization water-containing acid or basic salts.

Example 5

Two components B1 and B2 were prepared. Component B1 was prepared from 90% of SPUR 1015 LM, 5% of aluminum hydroxide phosphate$\times 12H_2O$ and 5% of pyrogenic silica, and component B2 was prepared from 86% of OH-terminated polydimethylsiloxane, 8% of aluminum hydroxide phosphate$\times 12H_2O$ and 6% of pyrogenic silica. The component A1 and one each of component B were thoroughly mixed at a weight ratio of 100:25 in the speed mixer, and the mixture was used for adhesively bonding aluminum test bodies. The two aluminum halves were pretreated with a primer and were adhesively bonded in a manner that produced a bonding area of 15 mm×50 mm at a distance of the two halves of 1.5 mm.

The parts thus bonded were elongated in a tensile test according to EN 28339, method A, performed in a tensile testing machine after defined time intervals at room temperature at a rate of elongation of 6 mm/min until rupture. During this test, a maximum load was measured in each case, and the average value obtained from three samples is shown in Table 5. Further, it will be examined whether the rupture occurs in the cured mixture (cohesive) or on the adhesive surface (adhesive). Additionally determined after 7 days was the breaking elongation according to DIN EN 28339 as an average value from 3 samples.

TABLE 5

| Time | Component B1 | | Component B2 | |
| --- | --- | --- | --- | --- |
| | Maximum force | Rupture | Maximum force | Rupture |
| 2 hours | 0.49 N/mm² | adhesive/cohesive | 0.37 N/mm² | adhesive/cohesive |
| 3 hours | 0.66 N/mm² | adhesive/cohesive | 0.55 N/mm² | cohesive |
| 5 hours | 0.73 N/mm² | cohesive | 0.76 N/mm² | cohesive |
| 8 hours | 0.88 N/mm² | cohesive | 0.87 N/mm² | cohesive |
| 24 hours | 1.05 N/mm² | cohesive | 1.04 N/mm² | cohesive |
| 7 days | 1.49 N/mm² | cohesive | 1.17 N/mm² | cohesive |
| breaking elongation after 7 days | 370% | | 200% | |

This example shows the buildup of the strength and of the adhesion in the tensile test. It can be clearly seen that 30 to 60% of the final strength of the vulcanizate can be determined within the $2^{nd}$ to $8^{th}$ hour. From the $2^{nd}$ hour on the force is sufficient for obtaining the functionality of an adhesive bonding. In practice, the compounds of the invention show the desired breaking elongation of 150% and even better of at least 200% for sealants and of 50% and even better of at least 100% for bonding agents.

The build-up of the adhesion to the substrate is already obtained during the first 5 hours. From this point of time, any loss of adhesion until rupture of the sample is not determined in the tensile test, but the sample tears in the adhesive.

Example 6

Using the same procedure as for component A1 in example 1, components A2 and A3 were prepared from different silane-modified polymers. For the formulations see Table 6.

TABLE 6

| | Component | | |
| --- | --- | --- | --- |
| | A1 | A2 | A3 |
| Geniosil STP-E 10 | 16% | | |
| SPUR 1015 LM | | 20% | |
| MS Polymer S 303 | | | 33% |
| Diisononylphthalate | 18% | 19% | 18% |
| Stabilizers | 0.5% | | |
| Antioxidants/UV absorbers | | 0.7% | 0.7% |
| Precipitated coated $CaCO_3$ | 48% | 42% | 40% |
| Natural $CaCO_3$ | 12% | 14% | |
| Vinyltrimethoxysilane | 1.5% | 1.3% | 0.7% |
| Adhesion promoter γ-aminopropyltrimethoxysilane | 1% | | |
| Adhesion promoter Y-15744 | | 0.8% | |
| Adhesion promoter N-β-aminoethyl-γ-amionpropyl-trimethoxysilane | | | 1% |
| Dibutyltinlaurate | 0.02% | 0.2% | 06.% |
| Titanium dioxide R-KB-2 | | 2% | 6% |
| Pigment paste | 2.98% | | |

The components A2 and A3 cure in the same manner as component A1 when they have contact with the air and when they can react with the air moisture. The cross-linking curing action proceeds from the surface, i.e. the contact surface with the air.

B components B3 through B6 with different dispersed crystallization water-containing salts were prepared under vacuum conditions in the planetary dissolver. Various substrates were used, and the percentages of pyrogenic silica were chosen so that a homogeneous, slightly stead paste was obtained in each case. The formulations are shown in Table 7.

TABLE 7

| | Component | | |
| --- | --- | --- | --- |
| | A1 | A2 | A3 |
| SPUR 1015 LM | 88% | | |
| OH-terminated polydimethylsiloxane, 20,000 mPas | | 86% | |
| Diisononylphthalate | | | 78% |
| Ammonium aluminum sulfate × 12 $H_2O$ | 8% | | |
| Iron-II-sulfate × 7 $H_2O$ | | 8% | |
| Aluminum hydroxide phosphate × 12 $H_2O$ | | | 8% |
| Pyrogenic silica | 4% | 6% | 14% |

The components A1, A2 and A3 were combined with the components B3, B4 and B5 at a mixing ratio of 100:25. The components were mixed in the speed mixer and cuttability was measured at time intervals of 30 minutes and Shore hardness A was measured after 7 days. Moreover, directly after its preparation the mixture was applied as a bead on different substrates, and the adhesion was evaluated after 7 days. If no loss of adhesion to the substrate can be determined at the time the bead is peeled off, the adhesion will be judged positively. The results are shown in Table 8.

TABLE 8

|  | Component | | |
| --- | --- | --- | --- |
|  | A1, B5 | A2, B4 | A3, B3 |
| Cuttable after | 3 h | 5.5 h | 1 h |
| Shore A | 33 | 20 | 27 |
| Adhesion to: | | | |
| Aluminum | positive | positive | positive |
| Zinc sheet | positive | positive | positive |
| Eloxal | positive | positive | positive |
| Copper | positive | positive | positive |
| Brass | positive | positive | positive |
| V2A stainless steel | positive | positive | positive |
| Polyamide | positive | positive | positive |
| Polycarbonate | positive | positive | positive |
| Polyester (GfK) | positive | positive | positive |
| Hard PVC |  | positive | positive |
| Concrete | positive | positive | positive |
| Tile glazed, unglazed | positive | positive | positive |
| Glass | positive | positive | positive |
| Wood lacquers |  | positive |  |
| Artificial stone |  |  | positive |

These examples prove that the uniform, accelerated curing is obtained even if the substrate in the B component is varied. The accelerated curing effect is obtainable provided that the substrate material is the same as or similar to the silane-modified polymer like the SPUR 1015 LM prepolymer, if it is a plasticizer used in mixtures like diisononylphthalate, or if it is an OH-terminated polydimethylsiloxane, which is less preferred.

The individual examples listed up are different in the times at which cuttability is reached, in the final strength that can be obtained, and in the substances to which the cured product adheres.

Experiment A1, mixed with B5 at mixing ratio of 100:25, is repeated after 6 months. The result is cuttability after 90 minutes, which is a shorter time than directly after the preparation of the mixtures. The accelerated curing effect is also obtained after storage of the B component.

Compared to prior art, the method described has the advantage that the mixing ratio of the components can be varied in a vast range and that the components can also be produced in different colors or with almost the same viscosity for obtaining a controllable quality of mixing.

In products which have component mixing ratios that are far away from each other, e.g. in the range of 100:10, and which have to be processed using a mixing and dosing unit, the mixing ratio must be accurately controlled in the previously known two-component systems. With the invention, the mixing ratio is much less critical with respect to variations.

With a suitable formulation, the build-up of adhesion to the different substrates is rapidly achieved, which increases process safety.

The mixtures can be prepared independently of the usual residual moisture of components, and a defined addition of water or of filling materials with a defined water percentage is not necessary. High water percentages could possibly decelerate the build-up of adhesion to e.g. glass or could negatively influence cross-linking. Control of the moisture added during the production of the individual components is complicated and is omitted in the process according to the invention. Also the naturally varying residual moisture, particularly of the filling materials, has not important influence on curing. Curing and the build-up of adhesion to the substrates proceed almost parallel. In the case of using the α-silane-terminated polymers, formulation is possible without the use of a tin catalyst or other metal-containing catalysts. Moreover, the system can be formulated silicon-free so as to exclude incompatibility with subsequently performed varnishing processes or with coated glass or natural stone or with other materials it comes in contact with.

Provided that the components are suitably adjusted to each other, deep curing takes place uniformly even at layer thickness of the applied volume of 1 or several cm.

Curing is largely independent of the weather. Due to the rapid curing, even an unexpected weather change such as sudden rain does not constitute a problem.

Example 7

Further A and B components were mixed in order to show how silane-modified polymer, salt and aminic adhesion promoter can be distributed to the same. Tables 9A and 9B show the composition, whereas the results are shown in Table 10.

TABLE 9A

| Substance | Component A4 | Component A5 | Component A6 | Component A7 | Component A8 |
| --- | --- | --- | --- | --- | --- |
| Polymer SPUR 1015 LM | 20% | 20% |  | 21% | 22.5% |
| Polymer STP-E10* |  |  | 16.5% |  |  |
| Aminic adhesion promoter I** |  |  |  |  | 1% |
| Dibutyltindilaurate | 0.2% |  |  | 0.2% |  |
| Plasticizer DINP | 18.3% | 20% | 15% | 17.8% | 15% |
| Preticipated chalk | 45% | 45% | 50% | 43% | 45% |
| Natural chalk | 13% | 13.8% | 15% | 15% | 13% |
| Hydrophobic silica | 1% |  | 1% |  | 1% |
| Vinyltrimethoxysilane | 2.5% | 1.2% | 2.5% | 3% | 2.5% |

TABLE 9B

| Substance | Component B6 | Component B7 | Component B8 | Component B9 |
| --- | --- | --- | --- | --- |
| Al(OH)(PO4) × 12 H2O | 10% | 10% | 10% | 8% |
| Aminic adhesion promoter I** | 6% |  | 6% |  |
| Aminic adhesion promoter II** |  | 6% |  |  |
| Dibutyltin dilaurate |  |  | 1% | 1% |
| Plasticizer DINP | 70% | 70% | 69% | 79% |
| Hydrophobic silica | 14% | 14% | 14% | 12% |

*silane-modified polymer with NH-groups
**γ-aminopropyltrimethoxysilane
***Y-15744 produced by Momentive Performance Materials Inc.

TABLE 10

|  | Cuttability after at a ratio of | | |
| --- | --- | --- | --- |
| Mixing of | 100:100 | 100:50 | 100:25 |
| A4 + B6 | 16 hours | 24 hours | 32 hours |
| A4 + B7 | 9 hours | 16 hours | 24 hours |
| A5 + B8 | 1 hour | 1 hour | 4 hours |
| A6 + B5 | 1 hour | 1 hour | 3.5 hours |
| A7 + B6 | 15 hours | 16 hours | 23 hours |
| A8 + B9 | 6 hours | 7 hours | 18 hours |

It can be seen that both the aminic adhesion promoter and the catalyst can be readily brought-in in the component having the crystallization water-containing acid or basic salt. It is not necessary that the same is brought-in together with silane-modified polymer.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as defined by the appended claims.

We claim:

1. A curable composition, comprising a mixture of at least two components to be stored separately, a first component comprises a silane-modified polymer, and the first component or a second component comprises an acid or basic salt containing water of crystallization, and an aminic adhesion promoter is contained in at least one of the first component, the second component or a third component, wherein the adhesion promoter is an aminic silane or a siloxane compound, provided that none of the components contains a silane-modified polymer and an acid or basic salt containing water of crystallization, and an aminic adhesion promoter, wherein the silane-modified polymer is a silane-modified polyether or a silane-modified polyurethane or a mixture thereof different from silicones and having a structure

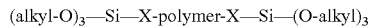

(alkyl-O)$_3$—Si—X-polymer-X—Si—(O-alkyl)$_3$ or

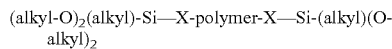

(alkyl-O)$_2$(alkyl)-Si—X-polymer-X—Si-(alkyl)(O-alkyl)$_2$ wherein X is an alkylene compound group, and
wherein the salt containing water of crystallization is a hydroxide phosphate.

2. The composition according to claim 1, wherein a cation of the salt is selected from ammonium and metal cations of metals of main group III or subgroup VIII of the Periodic Table.

3. The composition according to claim 1, wherein one of the components contains 3 to 50% by weight of silane-modified polymer, 0 to 40% by weight of a plasticizer, 0 to 60% by weight of fillers, 0 to 2% by weight of stabilizers, 0 to 5% by weight of desiccants, 0 to 10% by weight of aminic adhesion promoters, and 0 to 2% by weight of catalysts, provided that total of all components equals 100%.

4. The composition according to claim 1, wherein one of the components contains 1 to 90% by weight of the salt, 10 to 95% by weight of a substrate, 30% by weight of a filler, and 0 to 50% of stabilizers, desiccants, catalysts and additional fillers, provided that total of all components equals 100%.

5. The composition according to claim 4, wherein the filler comprises silica.

6. The composition according to claim 4, wherein the substrate is selected from silane-modified polymers, plasticizers, hydroxyl-terminated polydialkylsiloxane, and alkyl-terminated polydialkylsiloxane.

7. The composition according to claim 1, wherein at least one of the components contains plasticizers selected from phthalates, cyclohexane dicarboxylic acid esters, esters of organic acids, derivatives of polyesters, polyethers, epoxides, polybutenes, ricinus oil (castor oil), natural oils, and mixtures thereof.

8. The composition according to claim 1, wherein at least one of the components contains fillers selected among silica, bentonite, barium sulfate, clay, aluminum oxides, and hydroxides, chromium oxides, titanium dioxides, graphite, carbon black and mixtures thereof.

9. The composition according to claim 1, wherein the first component contains the silane-modified polymer and the aminic adhesion promoter, and the second component contains the acid or basic salt containing water of crystallization.

10. The composition according to claim 1, wherein the first component contains the aminic adhesion promoter, and the second component contains the acid or basic salt containing water of crystallization and the silane-modified polymer.

11. The composition according to claim 1, wherein the first component contains the silane-modified polymer, and the second component contains the acid or basic salt containing water of crystallization and the aminic adhesion promoter.

12. The composition according to claim 1, wherein at least one of the components additionally contains at least one of plasticizers, fillers, stabilizers, desiccants, non-aminic adhesion promoters, and catalysts.

13. The composition according to claim 1, totally comprising 5 to 50% by weight of at least one silane-modified polymer, 1 to 15% by weight of at least one crystallization water-containing acid and/or basic salt, 0.1 to 5% by weight of at least one aminic adhesion promoter and 0 to 2% by weight of at least one catalyst.

14. The composition according to claim 13, totally comprising 10 to 40% by weight of at least one silane-modified polymer, 3 to 10% by weight of at least one crystallization water-containing acid and/or basic salt, 0.5 to 2% by weight of at least one aminic adhesion promoter, and 0.1 to 1% by weight of at least one catalyst.

15. The composition according to claim 1, wherein the compound is solvent-free or silicone-free or solvent and silicone-free in all of the components.

16. A method for accelerating curing of compounds based on the silane-modified polymer according to claim 1, the method comprising providing a silane-modified polymer which is cross-linkable with water and which comprises a silane-modified polyether or a silane-modified polyurethane or a mixture thereof different from silicones, a crystallization water-containing acid or basic salt, which is a hydroxide phosphate, and an aminic adhesion promoter, which as an adhesion promoting component contains an aminic silane or siloxane compound, distributing the foregoing to at least two of the components in such a manner that none of the components contains a silane-modified polymer, an acid or basic salt containing water of crystallization, and an aminic adhesion promoter, and mixing the at least two components for curing.

* * * * *